(12) United States Patent
Jung

(10) Patent No.: US 6,457,726 B1
(45) Date of Patent: Oct. 1, 2002

(54) STAMPED SEALING ARRANGEMENT FOR A FLAT FLANGED JOINT

(76) Inventor: Alfred Jung, Birresborner Strasse 4, Cologne (DE), D-50935

( * ) Notice: Subject to any disclaimer, the term of this patent is extended or adjusted under 35 U.S.C. 154(b) by 0 days.

(21) Appl. No.: 09/622,925

(22) PCT Filed: Feb. 19, 1999

(86) PCT No.: PCT/EP96/01080
§ 371 (c)(1),
(2), (4) Date: Sep. 7, 2000

(87) PCT Pub. No.: WO99/45298
PCT Pub. Date: Sep. 10, 1999

(30) Foreign Application Priority Data

Mar. 7, 1998 (DE) .......................................... 198 09 864

(51) Int. Cl.$^7$ ............................. F16L 17/06; F02F 11/00
(52) U.S. Cl. ....................... 277/611; 277/616; 277/627; 277/639; 277/651; 277/593
(58) Field of Search ................................. 277/592, 593, 277/597, 611, 612, 616, 627, 638, 639, 651, 938

(56) References Cited

U.S. PATENT DOCUMENTS

| 368,189 | A | * | 8/1887 | Carter | |
| 3,930,656 | A | * | 1/1976 | Jelinek | 277/612 |
| 4,690,438 | A | * | 9/1987 | Kanczarek | 277/616 |
| 5,421,594 | A | | 6/1995 | Becerra | 277/213 |
| 5,938,246 | A | * | 8/1999 | Wallace et al. | 277/612 |

FOREIGN PATENT DOCUMENTS

| DE | 970950 | 10/1958 |
| DE | 4139453 | 6/1992 |
| DE | 29504402 | 8/1995 |
| EP | 0268134 | 5/1988 |

* cited by examiner

*Primary Examiner*—Anthony Knight
*Assistant Examiner*—Enoch Peavey
(74) *Attorney, Agent, or Firm*—Jacobson Holman, PLLC

(57) ABSTRACT

The sealing arrangement for a flat flanged joint comprising a preferably metallic base body 1 has bearing surfaces 7, 7' on each of its two sides for ring-shaped supports (11, 12) made of a soft material, the bearing surfaces (7, 7') being flat over a large area and being situated essentially directly opposite to each other, at least one ring tooth (2, 3) being provided in the inner radial area of each bearing surface and preferably at least one ring tooth (5, 6) being also provided in the outer radial area of each bearing surface, said soft material supports each being fixed on the bearing surfaces (7, 7'), the ring teeth (2, 3, 4, 5, 6), when the arrangement is assembled, coming to rest on the flange surfaces (14, 15), and the soft material supports (11, 12) being at least inwardly limited by the ring teeth (2, 3), wherein the wall of the base body (1) has a low thickness of only 0.2 to 2.0 mm, preferably 0.3 to 1.2 mm, and the ring teeth are shaped by stamping in such a way that the whole wall has an angular or wave-shape configuration, and a punctual metallic contact with the flange surfaces (14, 15) is enabled.

17 Claims, 3 Drawing Sheets

STAMPED SEALING ARRANGEMENT FOR A FLAT FLANGED JOINT

The present invention relates to a sealing arrangement for a flat flanged joint comprising a preferably metallic base body having bearing surfaces on each of its two sides for ring-shaped supports made of a soft material, the bearing surfaces being flat over a large area and being situated essentially directly opposite to each other, at least one ring tooth being provided in the inner radial area of each bearing surface and preferably at least one ring tooth being also provided in the outer radial area of each bearing surface, said soft material supports each being fixed on the bearing surfaces, the ring teeth, when the arrangement is assembled, coming to rest on the flange surfaces, and the soft material supports being at least inwardly limited by the ring teeth. A generic sealing arrangement can be seen from DE 295 04 402 U1. The two bearing surfaces are flat over a large area and are situated opposite to each other. In the outer radial area of each bearing surface, there is an outer ring tooth, and in the inner radial area, there is an inner ring tooth. Supports made of a soft material, usually graphite, are bonded onto the bearing surfaces. When the arrangement is assembled, the soft material supports are embedded between the ring teeth, the flanges and the bearing surfaces of the base body. As a consequence of this encapsulation, a soft material support cannot crawl beyond the ring teeth. In the known sealing arrangement, the ring teeth are prepared by turning on a lathe or by stamping, i.e., each tooth is solid and consists of the same material as the base body. This kind of preparation by turning on a lathe or stamping is very material-intensive and labor-intensive and therefore relatively expensive. In addition, from a certain diameter, the die-cut blank can no longer be stamped into an encapsulated seal so that too solid outer and inner teeth are formed. In this case, the die is not capable of exerting the necessary force so that the blank is deformed in such a way that too solid outer and inner teeth are formed.

EP-A-268 134 describes a cylinder head gasket in which the metal sheet is bent open to a U shape, and in addition, adjacent wave-shape impressions are preferably present. Another unclaimed embodiment shows a metallic base body with an enlargement formed by upsetting. This is intended to achieve that the graphite layers covering the crests of the waves are compressed to a particularly high extent at these waves, and in addition, a purely metallic seal towards the combustion chamber is produced. This type of cylinder head gasket has not proven useful in practice because already the preparation of these metallic base bodies is extraordinarily difficult and expensive. Further, a compression of the graphite layers occurs only in the range of the wave-shaped impression towards the inside. This cylinder head gasket is a friction-type shunt seal, i.e., a seal in which almost the whole force leads to a contact of metal on metal. In these contact sites, the soft material support is destroyed. In contrast, in the inner zone of the gasket, the soft material support is not sufficiently compacted.

Further, the so-called wave-ring seal is known which also has a metallic base body with soft material supports on both sides. In this arrangement, the base body is wave-shaped throughout its width. Thus, the bearing surfaces of the base body for the soft material supports are also wave-shaped. When the arrangement is assembled, the base body does not contact the. flange so that encapsulation of the soft material supports. does not occur. In another commercially available seal arrangement, the base body also comprises bearing surfaces for ring-shaped supports made of a soft material on both of its sides. This base body has a meandering configuration throughout its width so that proper ring teeth are not present. The base body comes to rest on the flanges on several relatively broad areas, and between them, there are the soft material supports which are thus also compartmentalized. However, they are not positioned opposite to each other, but radially juxtaposed. Therefore, these seal arrangements are relatively broad and often exhibit crevice corrosion due to the broad metallic stamping surfaces which come into contact with the flange. This then results in gradual leakage of the flanged joint. In addition, all these seals have the great disadvantage that they have virtually no spring properties.

In the prior art, there are further so-called metal-reinforced seals consisting of a metallic base body and supports made of a soft material, such as graphite, provided on both sides thereof. Such metal-graphite seals belong to the so-called spiked-sheet, burr-sheet seals having a, mostly pin-bearing, steel ring with a graphite support or a similar soft material provided on both sides thereof, which is yet to be compacted, however. Depending on the application, such soft material supports can already have a precompaction which is independent of the designated pressure range, however. When mounted in the arrangement, the soft material supports are further compacted by the screw force applied, up to the maximum possible compaction. Thus, the higher the soft material supports are compacted, the better is the leakage rate. In these spiked-sheet, burr-sheet or aramide fiber seals, for example, according to DIN 2690 for DIN flanges or also for ANSI flanges, the area to be sealed ranges from the flange shoulder to just before the screw holes of the centering screw.

Since the flange sealing beads are very broad in DIN and ANSI flanges, the screw force exerted is distributed onto the very broad sealing bead of the flanges and thus onto the whole sealing width of the seal. However, the smaller the sealing area of the seal, the higher is the surface pressure for equal screw forces. Therefore, seal manufacturers seek to reduce the sealing width or sealing area of the seal.

With so-called grooved seals or spiral seals, this is possible without difficulty. With spiked-sheet, burr-sheet or other soft material seals, this is not possible because they are die-cut from seal plates. In order to reduce the sealing area in these die-cut seals as well, some manufacturers have begun to precompact the graphite of a die-cut seal, e.g., according to DIN 2690, from the outer edge of the seal to the average diameter of the seal. Such precompaction is effected by exerting a force, for example, by means of a large press. While such seals are precompacted from the outer edge to the center, they also exhibit the drawback that the seal, when mounted, is aftercompacted by the exertion of the screw force from the inner edge of the seal to the already precompacted center. Thus, ultimately, the graphite is again more or less uniformly compacted throughout the area. One great disadvantage of this approach is that the screw force exerted is not applied to a narrow sealing region, as desired, but to the whole sealing area of the seal. Thus, after mounting or in the mounted state, the density of the soft material support is again almost equal throughout the area.

It has been the object of the present invention to provide a sealing arrangement for a flat flanged joint which, while having an at least equal leakage rate performance, exhaust-proof property and component safety as with the seals of the prior art, can be prepared with lower cost. At the same time, if possible, the insertion height shall be reduced, and the sealing width be relatively low. These objects are achieved by the sealing arrangement according to claim 1.

Further, preferably, the seal shall have such a design that the soft material supports, in the mounted state, have a higher density on both sides from the inner diameter up to a certain outer zone. Then, while the thickness is equal, such a seal has a higher compaction on the inside, towards the medium, and a substantially lower compaction towards the outside, i.e., towards the atmosphere. By having a higher compaction on the inside, a substantially higher surface pressure is achieved in the inner zone. In contrast, the outer edge of the seal is hardly compacted. This is sufficient, however, to shield the flange sealing bead in such a way that the flanges cannot corrode from the atmospheric side. One great advantage is that the flanges are not deteriorated by corrosion and need not be reworked prior to being reinserted. Thus, the maintenance cost can be reduced to just a fraction thereof. In particular, the sealing arrangements according to the invention are designed in such a way that the soft material support on the metallic base body is calculated to be at almost maximum compaction in the mounted state, the stamped inner teeth and the optionally present outer teeth having spring properties. The spring properties are selected such that, after demounting the seal from the flange, the depth of teeth can restore to the state as before the mounting and thus the original depth of teeth is recovered.

Due to the fact that the wall of the base body has a relatively low thickness of 0.2 to 2 mm, preferably 0.3 to 1.5 mm, and due to the fact that the ring teeth form a wall whose cross-section has an angular or wave-shape configuration, the teeth are no longer solid. This not only means a saving of material. It also becomes possible thereby to prepare the ring teeth by stamping with a relatively low pressure, even for sealing arrangements having relatively large nominal diameters. However, just for large nominal diameters, the preparation of sealing arrangements provided with solid ring teeth would involve so great pressures that the teeth could be prepared only by turning on a lathe in practice. However, this is accompanied by long preparation times and a large expenditure of material so that such large seals become very expensive. By the fact that the bearing surfaces are situated essentially directly opposite to each other according to the invention, it is achieved that the ring-shaped sealing arrangement and thus also the sealing area can be kept small. Due to the low width of the maximum compaction portion of the soft sealing support, a higher surface pressure is obtained for an equal tightening force of the flange screws than would be obtained with a broader sealing arrangement. This results in a greater tightness and thus in improved leakage rates.

In addition, the relatively thin material of the base body results in a lower insertion height than with conventional metallic seals. At the same time, it enables the metallic base body to have good spring properties. The depth of teeth, i.e., the distance of the tip of the tooth from the plane of the bearing surface of the base body, is matched to the material of the soft material support and its compressibility. Thus, it is ensured that the thickness of the soft material support is compressed to such an extent in the mounted state that, on the one hand, the ring teeth provide an optimum metallic sealing and, on the other hand, the spring properties ensure that the flanges are not damaged beyond the limits of roughness values.

Preferably, the distance of the upper tooth tips from the upper bearing surface is as large as the distance of the lower tooth tips from the lower bearing surface. This means that the base body, in the range of the bearing surfaces, will be positioned in the middle of the two flange surfaces in the mounted state. Thus, comparably good sealing values are achieved on both sides of the base body.

In order to increase the strength and tightness in the inner zone of the bearing surfaces of the base body, i.e., in the zone facing the flowing medium, it is recommendable to shape the wall in such a way that several contact points with the flange surfaces are provided. Thus, the contact points neighboring the bearing surfaces provide for a further metallic seal and additionally ensure a good compartmentalization or encapsulation of the soft material supports. At the same time, these additional contact points give a higher strength in these zones whereby the reliability is also increased.

The sealing arrangements according to the invention can be employed for piping flanges as well as for apparatus, compressors, engines and fittings. For piping flanges, the sealing arrangement is preferably provided with an outer centering ring. It generally has an outer diameter which is slightly smaller than the imaginary circle which would contact the flange screws from inside. Thus, when mounted, the centering ring reaches to near the inner boundary of the screws whereby the sealing arrangement is also centered.

Preferably, this centering ring has a small bead on its outer perimeter which prevents the centering ring from getting into the threads of the screws and from damaging the screws on their outer perimeters when they are turned. To avoid such damage, the prior art also prepared seals whose graphite support reached to the outer edge of the base body, i.e., also in the area of the centering ring. This means an unnecessary increase in price and wasting of soft material support. Nevertheless, this construction was not always able to prevent the centering rings from getting into the threads of the screws.

In the cases where the sealing arrangements are only employed at low temperatures and therefore the atmosphere cannot attack the soft sealing material support, the ring teeth in the outer zone can be dispensed with. In contrast, in cases of application at higher temperatures at which the outer atmosphere could attack the soft material support, ring teeth are also necessary in the outer zone so that the soft sealing material support as a whole is compartmentalized and protected against attacks from both inside and outside.

To avoid corrosions of the flange surfaces in the outer zone, it may be recommendable to provide material of the soft material support in the outer zone as well. However, in this zone, a high compaction should be avoided in order to keep the surface pressure in the inner zone high. Thus, in the outer zone, the soft material support only serves for corrosion protection of the flange surfaces.

Such different zones of the soft material support can be obtained, for example, either by stamped soft material supports having a decreasing density throughout the width of the seal from the inner to the outer diameter while the thickness remains constant, or else by the ring-shaped soft material supports having a thicker design towards the inside than towards the outside so that only the inner zone is highly compacted when the screws are tightened and the sealing effect is provided only there. By means of a newly developed special method for the preparation of soft material supports of graphite, it is possible both to apply a soft material support of varying thickness without using an adhesive, and to precompact the parts having a higher graphite thickness using a special tool. In this way too, a soft material support is formed whose total thickness, although being uniform, has a different compaction in the inner and outer zones.

In the accompanying FIGS. 1 to 9, the novel sealing arrangement is illustrated in more detail wherein.

In these Figures, the symbols have the following meanings:

| | |
|---|---|
| 1 | a part of a base body |
| 2,3,4,5,6 and 9 | ring teeth |
| 7,7' | bearing surfaces for soft material supports |
| 8 | a bead on the outer edge of the centering ring |
| 11,12 | soft material supports |
| 14,15 | parts of a flange |
| 20 | part of a screw |

In the Figures, it is considered that the sealing arrangement has been mounted horizontally. Therefore, reference is made to the right or left portion of the sealing arrangement. Of course, the seals can be mounted in any desired orientation. If they were mounted vertically, reference would have to be made to upper and lower portions. Since the sealing arrangement has rotation symmetry, the Figures always show cross-sections only of the right portion.

Figure 1:
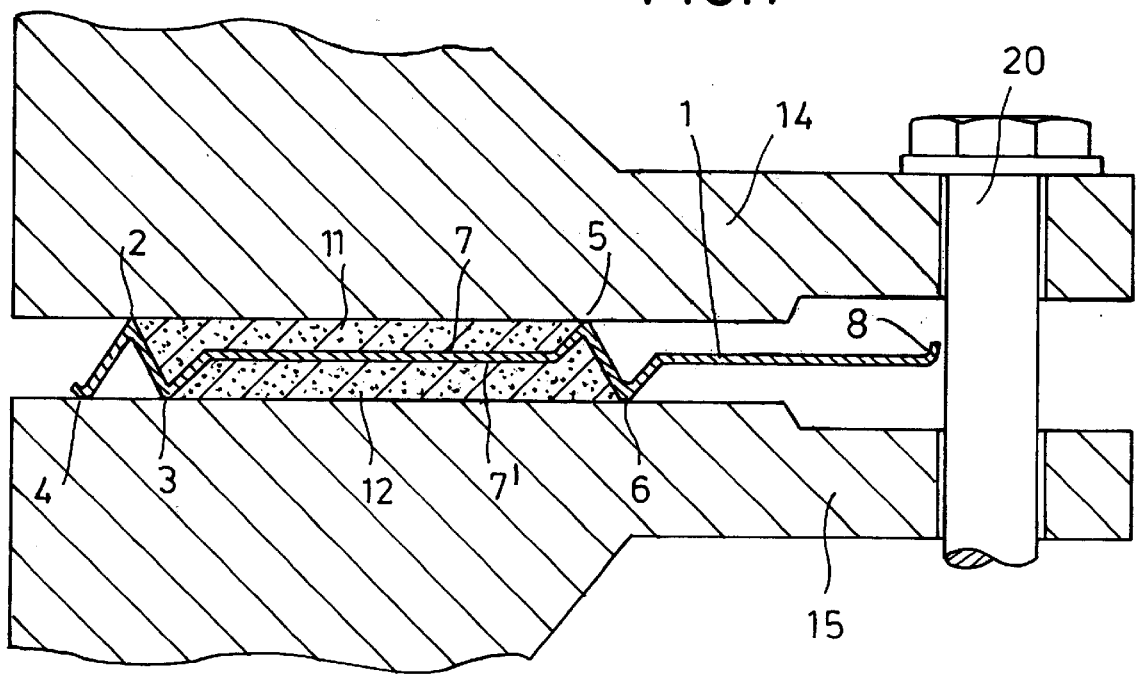
FIG. 1 shows the right portion of a sealing arrangement according to the invention in a mounted state in a cross-sectional view with angular ring teeth in the outer and inner radial areas of the bearing surfaces.

FIG. 1 shows the sealing arrangement in a state mounted between flanges 14 and 15 in a highly magnified scale. It consists of a base body 1 and two soft material supports 11 and 12. The base body is preferably metallic, and the soft material supports are especially made of graphite or PTFE. The soft material supports are applied and generally bonded to the bearing surfaces 7 and 7'. However, application without an adhesive is also possible. It is essential that the bearing surfaces are essentially opposite to each other, with only a slight radial dislocation.

In this case, the ring teeth serving for compartmentalization preferably have an angular design. In this case, the teeth may also referred to as having a Z shape since their cross-section has a Z-shaped appearance. For compartmentalization of the upper soft material support 11, the ring tooth with the contact point 5 is provided in the outer radial area (sealing against the atmosphere), and the ring tooth with the contact point 2 is provided in the inner radial area (sealing against the medium).

The lower soft material support 12 is compartmentalized by the ring teeth with the contact points 6 and 3. To increase the strength of the ring tooth with contact point 2 in the inner zone, the base body is stretched to the opposing flange 15 after contact point 2 and there again comes to rest on the flange in contact point 4. Thus, the upper flange 14 is sealed three times, from inside to outside through contact point 2, soft material support 11 and contact point 5. The lower flange 15, through contact points 4 and 3, soft material support 12 and contact point 6, is sealed a total of even four times. This embodiment is protected by the soft material supports not only against the liquids and gases inside the piping, but also from attack of the outside atmosphere. Therefore, this embodiment is mainly suitable for elevated temperatures. The base body stretches through the area of the opposing bearing surfaces 7, 7', preferably midway between the two flanges, the contact points 2 and 5 having about the same distance from the plane of the upper bearing surface as contact points 4, 3 and 6 have from the lower bearing surface 7'.

Adjacent to the outer ring tooth 6 is a centering ring which is formed from another ring surface of the base body. The outer diameter of the centering ring is but slightly smaller than the diameter of the imaginary circle which the screws 20 would contact on the inside. Thus, the sealing arrangement can be easily centered as soon as some of the screws are inserted in the flange bores. When the screws are turned and if the outer edge of the centering ring should engage in the threads, the base body could be distorted. To prevent this and also to preserve the screws, it is generally intended to attach a bead 8 to the outer edge of the centering ring.

Figure 2:
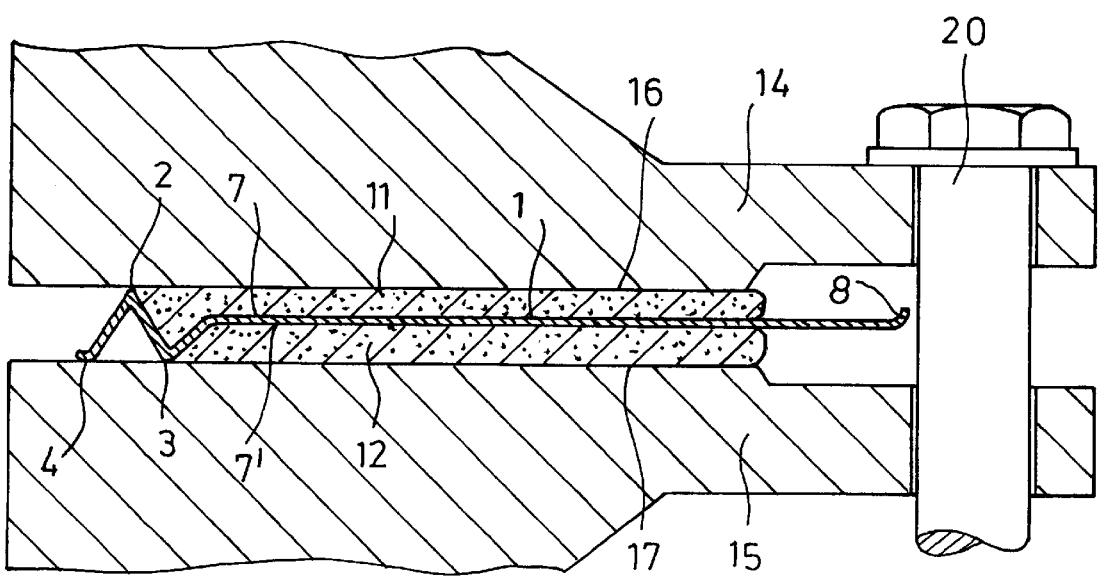
FIG. 2 shows the right portion of a sealing arrangement according to the invention in a mounted state in a cross-sectional view with angular ring teeth in only the inner radial area of the bearing surfaces.

In the sealing arrangement according to FIG. 2, ring teeth with contact points 4, 2 and 3 are intended only in the inner zone, but not in the outer zone. Thus, the upper soft material support 11 covers the upper flange 14 along the flange bead. For the lower soft material support 12, it is analogous up to the end of the sealing flange surface. This embodiment is employed mainly for seals used in normal or low temperature ranges in which the soft material support are not yet attacked by the atmosphere.

Figure 3:
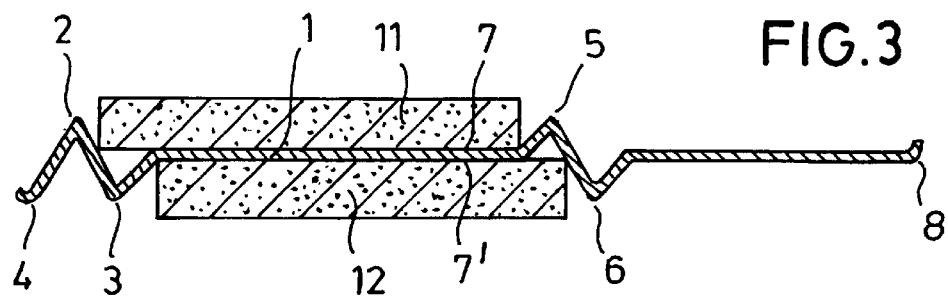
FIG. 3 shows the right portion of a sealing arrangement according to the invention in a non-mounted state in a cross-sectional view with angular ring teeth in the outer and inner radial areas of the bearing surfaces.

FIG. 3 shows the sealing arrangement of FIG. 1 with angular teeth in a non-mounted state. The upper plane of the upper soft material support 11 is situated above the upper edge of the two ring teeth with contact points 2 and 5. The lower plane of the lower soft material support 12 is situated below the lower edge of the lower ring teeth with contact points 4, 3 and 6. Only in the mounted state, a uniform upper contact area at the upper flange and a uniform lower contact area at the lower flange are formed by the compressing of the soft material supports within the limits of compressibility. The thickness of the soft material support, its compressibility and the depth of the ring teeth are preferably matched to one another in such a way that the ring teeth and the soft material supports abut against the flange sealing beads in a mounted state for an optimum sealing. For example, the most commonly used graphite, which has a density of 1.0 g/cm$^3$, can be compressed by a maximum of 53%.

Figure 4:
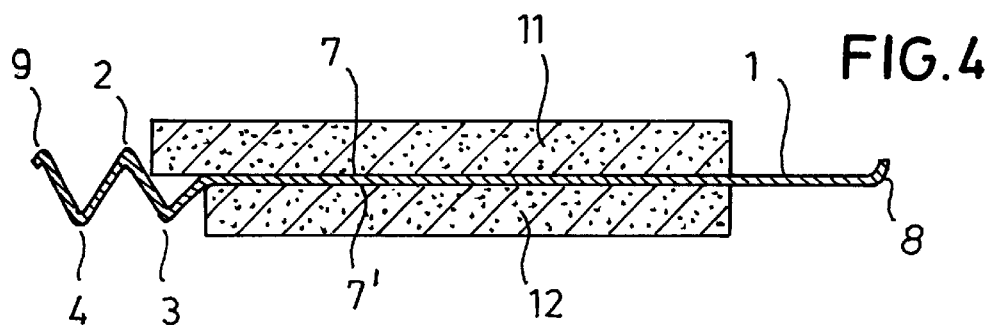
FIG. 4 shows the right portion of a sealing arrangement according to the invention in a non-mounted state in a cross-sectional view with angular ring teeth in only the inner radial area of the bearing surfaces.
Figure 5:
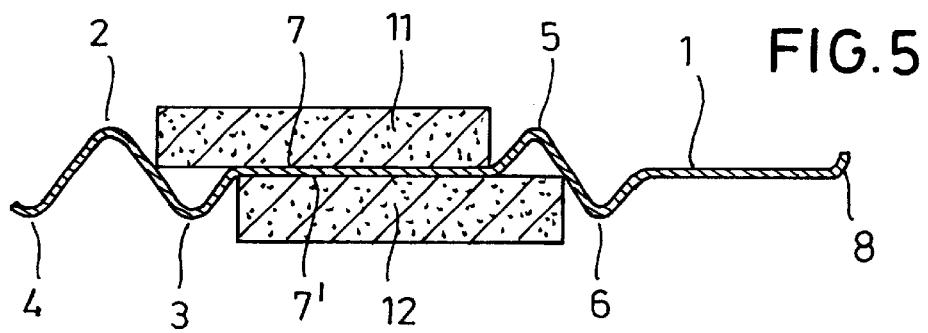
FIG. 5 shows the right portion of a sealing arrangement according to the invention in a non-mounted state in a cross-sectional view with wave-form ring teeth in the outer and inner radial areas of the bearing surfaces.

FIG. 4 shows the sealing arrangement according to FIG. 2 in a non-mounted state. In this case too, the upper and lower contact areas of the soft material supports protrude beyond the contact points of the respective ring teeth. The sealing arrangement according to FIG. 5 essentially corresponds to that according to FIG. 1. However, the teeth serving for compartmentalization of the soft material supports have a wave-shape rather than angular design. Thus, the teeth with their contact points 2, 3, 4, 5 and 6 have a somewhat larger contact area with the flanges than is the case with the angular teeth in FIG. 1. Due to the spring properties of the metal core, a good sealing nevertheless results when the pressure acting against the seal is moderate.

Figure 6:
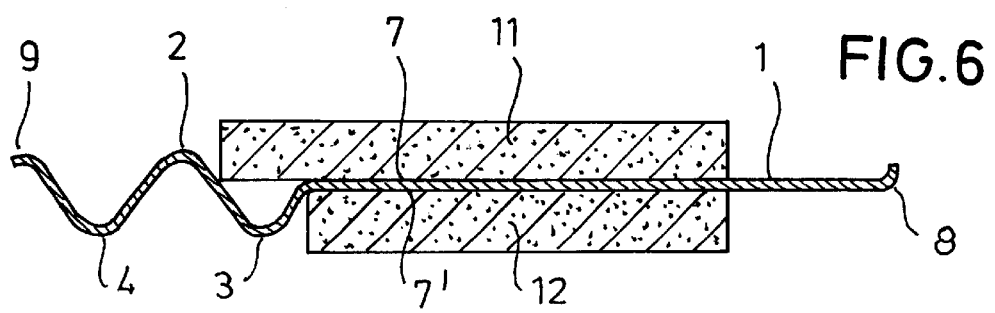
FIG. 6 shows the right portion of a sealing arrangement according to the invention in a non-mounted state in a cross-sectional view with wave-form ring teeth in only the inner radial area of the bearing surfaces.
Figure 7:
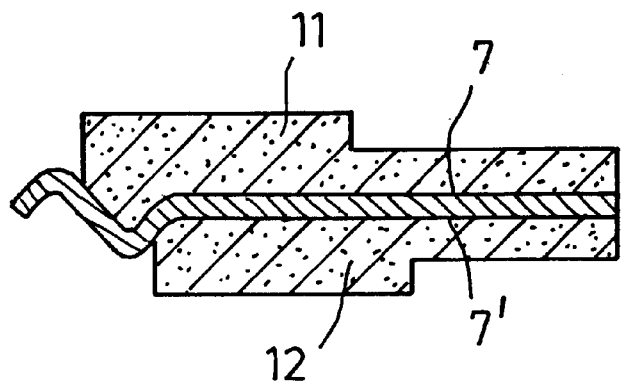
FIG. 7 shows the right portion of a. sealing arrangement according to the invention in a cross-sectional view with soft material supports the thickness of which is different on both sides thereof.
Figure 8:
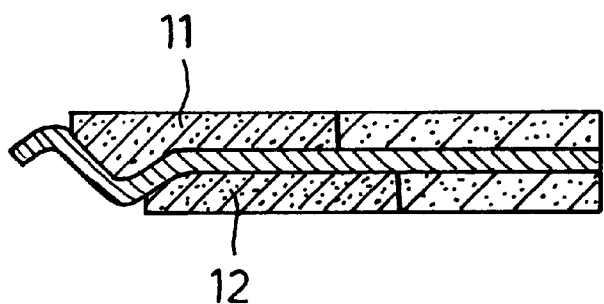
FIG. 8 shows the right portion of a sealing arrangement according to the invention in a cross-sectional view with soft material supports the thickness of which is equal on both sides thereof on the metal core having a varying density.
Figure 9:
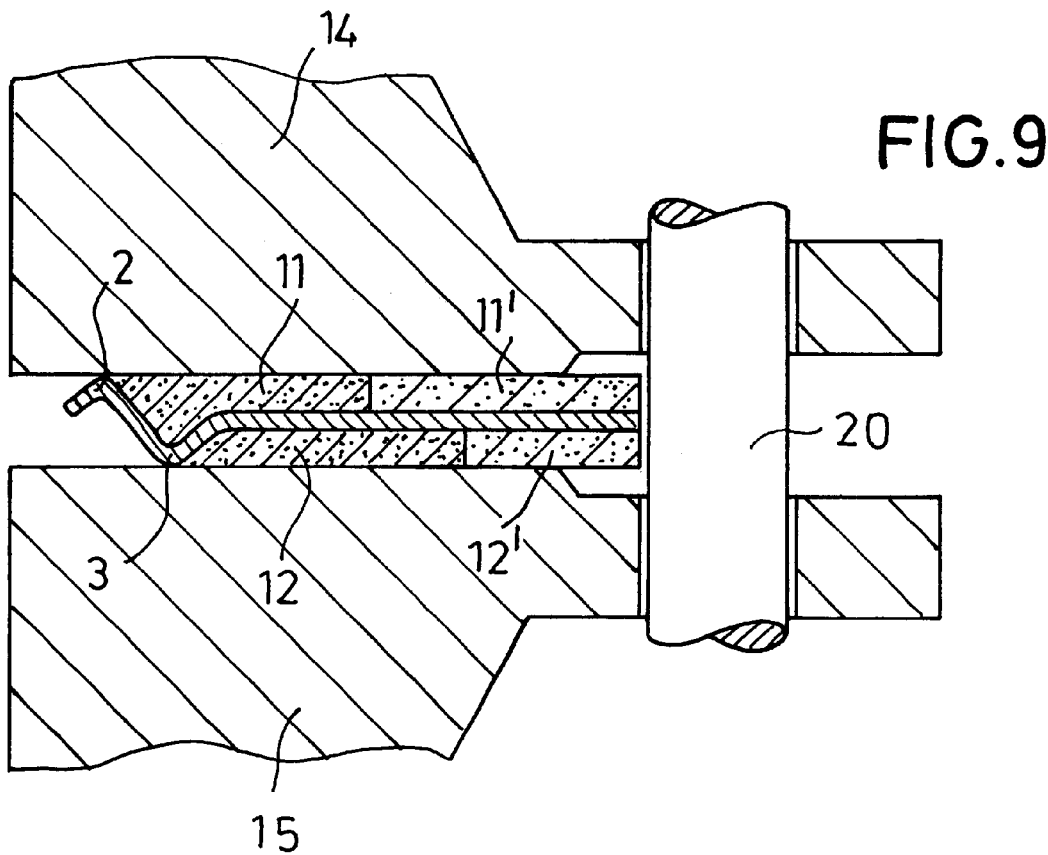
FIG. 9 shows a cross-sectional view of the seal in the right portion of a sealing arrangement according to the invention according to FIG. 7 in a mounted state between two flanges with a high final compaction on the inside and a slight compaction on the outside.

The sealing arrangement according to FIG. 6 essentially corresponds to that according to FIG. 2, but with wave-shape teeth. The sealing arrangement in FIG. 7 shows supports with a different thickness in the inner and outer zones. The sealing arrangement in FIG. 8 shows soft material supports with uniform thickness, but a varying density in the inner and outer zones. FIG. 9 shows the sealing arrangements according to FIGS. 7 and 8 in a mounted state. They have both different surface pressures in the inner and outer zones. The inner zone of the seal serves for sealing against the medium while the outer zone serves for corrosion protection for the flange surfaces.

A varying graphite thickness or a varying graphite density can be achieved, for example, using a newly developed method and a device developed for this method wherein the use of an adhesive on the metallic base body can even be dispensed with. At any rate, this provides the best sealing through high forces acting in the inner zone and a sufficient corrosion protection for the flange surfaces in the outer zone. Since the seals according to the invention are generally not covered with a soft material support in the outer zone or at least in the range of the centering ring, indications, marks etc. can be permanently stamped or pressed into here, so that it will be possible later to check whether the appropriate seal prescribed for the purpose has been employed in the respective place. In addition, this mark can later identify the manufacturer.

Of course, instead of a centering ring, it is also possible to equip the novel sealing arrangement with so-called variosegments according to WO 97/49939 which also allow for easy and reliable centering. Since the sealing arrangement according to the invention is to be as inexpensive as possible, the application of a centering ring with a bead is the simplest and less expensive embodiment.

What is claimed is:

1. A sealing arrangement for a flat flanged joint comprising a base body (1) having bearing surfaces (7, 7') on each of its two sides for ring-shaped supports (11, 12) made of a soft material, the bearing surfaces (7, 7') being flat over a large area and being situated essentially directly opposite to each other, at least two ring teeth (2, 3) being provided in the inner radial area of each bearing surface, said soft material supports each being fixed on the bearing surfaces (7, 7'), the ring teeth (2, 3), when the arrangement is assembled, coming to rest on the flange surfaces (14, 15), and the soft material supports (11, 12) being at least inwardly limited by the ring teeth (2, 3), characterized in that the wall of the base body (1) has a low thickness of only 0.2 to 2.0 mm, and the ring teeth are shaped by stamping in such a way that the whole wall has an angular or wave-shaped configuration, and a punctual metallic contact with the flange surfaces (14, 15) is enabled, and that said soft material supports (10, 12) on the base body (1) are calculated to be at almost maximum compaction in the mounted state, wherein the stamped inner teeth (2, 3) have spring properties which are selected such that, after demounting the seal from the flange, the depth of teeth can restore to the state as before the mounting and thus the original depth of teeth is recovered.

2. The sealing arrangement according to claim 1, characterized in that said base body (1) is a metallic base body.

3. The sealing arrangement according to claim 2, further comprising at least two ring teeth (5, 6) provided in the outer radial area of each bearing surface, the outer teeth (5, 6), when the arrangement is assembled, coming to rest on the flange surfaces (14, 15), and the outer teeth (5, 6) having spring properties which are selected such that, after demounting the seal from the flange, the depth of teeth can restore to the state as before the mounting and thus the original depth of teeth is recovered.

4. The sealing arrangement according to claim 2, characterized in that the wall of the base body (1) has a low thickness of only 0.3 to 1.2 mm.

5. The sealing arrangement according to claim 3, characterized in that the thickness of the soft material supports (11, 12), their compressibility and the depth of the ring teeth (2, 3, 5, 6) are matched to one another in such a way that the an optimum triple sealing results in the mounted state on both sides through the inner teeth (2, 3), the outer teeth (5, 6) and the soft material supports (11, 12).

6. The sealing arrangement according to claim 3, characterized in that said base body (1) has a centering ring subsequent to the outermost ring tooth (6) which centering ring has an outer diameter which is slightly smaller than the imaginary circle which would contact the flange screws (20) on the inside.

7. The sealing arrangement according to claim 6, characterized by having a bead (8) on its outer perimeter the outer diameter of which is slightly smaller than the imaginary circle which would contact the flange screws on the inside.

8. The sealing arrangement according to claim 3, characterized in that said ring-shaped soft material supports (11, 12) have a thicker design towards the inside than towards the outside.

9. The sealing arrangement according to claim 8, characterized in that said soft material supports of varying thickness are applied to the bearing surfaces (7, 7') without an adhesive and using a special tool.

10. The sealing arrangement according to claim 8, characterized in that those portions of the soft material support having a higher thickness have been precompacted with another special tool.

11. The sealing arrangement according to claim 10, characterized in that the total thickness of the soft material support is uniform while the compaction varies from the inner to the outer diameter.

12. The sealing arrangement according to claim 3, characterized in that said soft material supports (11, 12) have a density which decreases from inside to the outer diameter throughout the area of the seal while the thickness is uniform.

13. The sealing arrangement according to claim 2, characterized in that said base body (1) is stretched further inwards in the inner radial area after the contact point of the inner most ring tooth (2) on flange surface (14) up to a further inner ring tooth (4) which, in the mounted state, comes to rest on the opposing flange surface (15).

14. The sealing arrangement according to claim 2, characterized in that said base body (1) stretches midway between the flange surfaces (14, 15) in the area of its bearing surfaces (7, 7') in the mounted state.

15. The sealing arrangement according to claim 2, characterized in that the soft material supports (11, 12) substantially cover the whole outer sealing flange surface in the mounted state.

16. The sealing arrangement according to claim 2, characterized in that said soft material support is graphite.

17. The sealing arrangement according to claim 1, characterized in that said base body (1) is stretched further inwards in the inner radial area after the contact point of the inner most ring tooth (2) on flange surface (14) up to a further inner ring tooth (4) which, in the mounted state, comes to rest on the opposing flange surface (15).

\* \* \* \* \*